(12) United States Patent
Miller et al.

(10) Patent No.: US 7,712,570 B2
(45) Date of Patent: May 11, 2010

(54) CRASH SAFE VEHICLE BRAKE ASSEMBLY

(75) Inventors: Ryan A. Miller, Columbus, OH (US); Bradley W. Klein, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 280 days.

(21) Appl. No.: 11/422,879

(22) Filed: Jun. 8, 2006

(65) Prior Publication Data
US 2007/0283690 A1 Dec. 13, 2007

(51) Int. Cl.
*B60K 28/10* (2006.01)
*G05G 1/32* (2008.04)
(52) U.S. Cl. ............... 180/274; 74/512; 74/560
(58) Field of Classification Search ......... 180/274–278; 74/512, 560
See application file for complete search history.

(56) References Cited

U.S. PATENT DOCUMENTS

| | | | |
|---|---|---|---|
| 4,662,237 A | | 5/1987 | Kami et al. |
| 5,531,135 A | | 7/1996 | Dolla |
| 5,634,337 A | | 6/1997 | Gautier et al. |
| 5,765,468 A | * | 6/1998 | Gautier et al. ............ 92/169.3 |
| 5,848,558 A | * | 12/1998 | Isono et al. ................. 74/512 |
| 5,921,144 A | * | 7/1999 | Williams et al. ............ 74/512 |
| 6,041,601 A | | 3/2000 | Verbo et al. |
| 6,041,674 A | * | 3/2000 | Kato ........................... 74/512 |
| 6,055,883 A | * | 5/2000 | Kato ........................... 74/512 |
| 6,079,207 A | | 6/2000 | Stadler et al. |
| 6,109,164 A | * | 8/2000 | Okuhara et al. ............ 91/376 R |
| 6,112,616 A | * | 9/2000 | Schonlau et al. ............ 74/512 |
| 6,176,340 B1 | * | 1/2001 | Mizuma et al. ............ 180/274 |
| 6,178,846 B1 | * | 1/2001 | Specht et al. ............... 74/512 |
| 6,209,416 B1 | * | 4/2001 | Tiemann et al. ............ 74/512 |
| 6,269,900 B1 | | 8/2001 | Adams et al. |
| 6,301,886 B1 | | 10/2001 | Kaneko et al. |
| 6,339,971 B1 | | 1/2002 | Kato |
| 6,481,311 B1 | | 11/2002 | Sanagi et al. |
| 6,539,823 B1 | * | 4/2003 | Tomono et al. ............ 74/512 |
| 7,111,703 B2 | * | 9/2006 | Endo et al. ................ 180/274 |
| 7,191,682 B2 | * | 3/2007 | Sando ........................ 74/560 |

(Continued)

FOREIGN PATENT DOCUMENTS

DE 19627775 1/1998

(Continued)

*Primary Examiner*—Ruth Ilan
*Assistant Examiner*—Laura Freedman
(74) *Attorney, Agent, or Firm*—Plumsea Law Group, LLC; Mark E. Duell

(57) ABSTRACT

A brake assembly configured to bias the master cylinder to rotate upward in a crash which induces the brake pedal to rotate down and away from the driver. This is achieved with a reduced number of parts, an angle reservoir for the initial position, a localized crush zone in the booster all configured to use the assembly's contact with the lower dash panel as a fulcrum point inducing downward rotation of the brake pedal. The present invention takes geometric advantage of its position proximate the lower dash panel to sure that when the engine compartment portion is pushed rearward toward the occupant compartment, the localized crush zone of the booster case induces upward rotation of the master cylinder causing the booster to pivot about the lower dash panel and cause the parallel brackets to rotate downward.

23 Claims, 5 Drawing Sheets

U.S. PATENT DOCUMENTS

| | | | |
|---|---|---|---|
| 7,275,614 B2 * | 10/2007 | Hayashi | 180/274 |
| 7,337,867 B2 * | 3/2008 | Morishita et al. | 180/274 |
| 7,383,752 B2 * | 6/2008 | Suzuki | 74/512 |
| 7,497,144 B2 * | 3/2009 | Yoon | 74/512 |
| 2003/0019320 A1 * | 1/2003 | Thistleton et al. | 74/560 |
| 2003/0075005 A1 | 4/2003 | Schiel et al. | |
| 2003/0221512 A1 * | 12/2003 | Sando | 74/560 |

FOREIGN PATENT DOCUMENTS

| | | |
|---|---|---|
| DE | 19718375 | 1/1998 |
| EP | 836968 A1 | 4/1998 |
| EP | 836968 B1 | 10/2001 |
| JP | 10310036 A * | 11/1998 |
| JP | 11105737 | 4/1999 |

* cited by examiner

CRASH SAFE VEHICLE BRAKE ASSEMBLY

BACKGROUND OF THE INVENTION

1. Field of the Invention

The present invention relates to crash-safe vehicle brake assembly designed to not only minimize intrusion of the assembly into the occupant compartment of the vehicle, but also to bias the movement of the brake pedal away from the driver in the event of a front impact collision.

2. Background of the Invention

Power brake assemblies for vehicles are by necessity generally mounted proximate the lower dash panel with the master cylinder, fluid reservoir, and booster on the engine compartment side and the brake pedal itself on the occupant compartment side of the lower dash panel. In the event of a front impact collision, components in the engine compartment are pushed rearward toward the occupant compartment, and in many cases the larger components of the brake assembly may themselves intrude into the occupant compartment, or cause the brake pedal and attendant linkages to move toward the driver and cause injury. Since many front impact collisions occur when the driver is trying to stop the vehicle and therefore the driver's foot is firmly applied to the brake pedal, significant rearward movement of the pedal itself or other brake assembly components is likely to injure the driver's foot and/or leg.

A schematic illustration of a conventional brake assembly before a frontal crash is shown in FIG. 1, and after a frontal crash is shown in FIG. 2. In these figures, dash lower panel D divides the engine compartment EC from the occupant compartment OC with master cylinder M and booster B mounted just inside engine compartment EC, and coupled to brake pedal P which is disposed inside the occupant compartment OC. The arrow in FIG. 1 shows the rearward direction of the force transmitted in a frontal crash. A component C in the engine compartment, such as the battery for example, is driven into master cylinder M. FIG. 2 schematically illustrates the position of the assembly pre-crash in solid lines and post-crash in dashed lines. When component C contacts master cylinder M, the force of the impact tends to move the brake assembly toward occupant compartment OC and brake pedal P upward. As noted previously, in a frontal crash it is likely that the driver has his or her foot firmly planted on the brake pedal. It is can be seen that the upward movement of the brake pedal can increase the possibility of injury to the driver.

There have been numerous previous attempts to address this problem. In one approach, various brackets, linkages or fasteners in the brake assembly are designed to fail upon frontal impact to, in essence, disconnect the engine compartment components from the brake pedal. U.S. Pat. No. 6,079,207 to Stadler et al., U.S. Pat. No. 6,339,971 to Kato; and U.S. Pat. No. 6,481,311 to Sanagi et al. disclose breakaway fastener concepts. U.S. Pat. No. 6,2969,900 to Adams et al.; and U.S. Patent Publication No. 2003/0075005 to Schiel et al. disclose linkages in a brake assembly which are designed to redirect the force of a frontal crash.

In another approach to the problem, other components are designed to fail to lessen the severity of a frontal crash. U.S. Pat. No. 5,531,135 to Dolla discloses a pedal arrangement in which the bulkhead is weakened at a buckle zone. Upon frontal impact the bulkhead buckle zone crumples and carries the bearing mounts and pedals with it away from the driver. Japanese Patent No. 11105737 to Tomonori also discloses a structural change to the engine compartment to inhibit intrusion of the brake components into the occupant compartment. A strut tower is designed with an inclined face to bear against the master cylinder upon impact and thereby cause the master cylinder to rotate upward.

U.S. Pat. No. 6,041,601 to Verbo et al. discloses a brake assembly mounted horizontally with a booster case having a multiple part front shell designed to separate and collapse in a crash to absorb the kinetic energy. U.S. Pat. No. 6,301,886 to Kaneko et al. also discloses a planned failure of the booster case caused by a specially designed diamond-shaped coupling flange on the master cylinder contacting and breaking through a booster shell wall that is weakened in a selected area. The coupling flange has an arc-shaped tip that is designed to break through the booster shell wall. Kaneko et al. also requires a specially designed reinforcing plate mounted inside the booster case on the master cylinder side. The reinforcing plate has a notched area through which the arc-shaped tip of the coupling flange passes through. Because the reinforcing plate rigidifies most of this inside assembly, the movement of the coupling flange through the notched area causes the master cylinder to break into the booster and incline. The goal of Kaneko et al. is to prevent movement of the push rods, pedals, etc. in the crew compartment when an external force is applied to the hydraulic pressure generating apparatus in the engine compartment. Another measure taught by Kaneko et al. to prevent movement of the valve housing, push rod and pedal is to incline booster and master cylinder upward with respect to the horizontal. Kaneko et al. requires the specially designed coupling flange to be positioned proximate the booster shell, and the specially designed mating reinforcing plate to be assembled inside the booster in order to achieve the goal of preventing movement of the pedal, push rods and other components inside the crew compartment.

The prior art examples discussed herein focus on either the engine compartment portion of the brake assembly, or the passenger compartment portion. That is, some address the need to prevent the engine compartment portion from intruding into the passenger compartment by way of breakaway fasteners or other parts failures that operably disconnect the engine compartment portion from the pedal. Others address the need to move the brake pedal, also by way of breakaway fasteners and the like. The prior attempts to design a brake assembly that reduces the possibility of injury to the driver in a frontal crash required a multiplicity of specially designed parts such as brackets with guide surfaces, linkages designed for failure, coupling flanges designed to collapse into a booster case, and reinforcing plates for rigidifying a booster case with complex configurations. Additional parts mean increased complexity, weight and higher costs of manufacture. Even with these complex assemblies and additional parts, the prior art does not address advantageous movement of both the engine compartment portion causing movement of the passenger compartment portion in response to a collision force.

There has been a need for a crash-safe brake assembly that reduces the amount of intrusion into the occupant compartment in the event of a crash. Not only that, but also recognition that since the driver's foot is likely already pressed to the brake during a frontal crash, there has been a need for a brake assembly that purposefully moves the brake pedal away from the driver to prevent injuries to the foot and/or leg.

SUMMARY

To address the known problems of brake assemblies intruding into occupant compartments and of brake pedals causing injuries to drivers in frontal collisions, the brake assembly of the present invention is configured to bias the master cylinder to rotate upward in a crash which in turn causes the brake pedal to rotate down and away from the driver. This is achieved with a reduced number of parts, an angle reservoir for the initial position, a localized crush zone in the booster all configured to use the assembly's contact with the lower dash panel as a fulcrum point inducing downward rotation of the brake pedal.

More specifically, the brake assembly of the present invention comprises two portions: the portion disposed in the engine compartment and the portion disposed in the occupant compartment. The engine compartment portion comprises the master cylinder, the hydraulic fluid reservoir and the booster. For description purposes the booster is described herein as having an engine side and an occupant side. The occupant compartment portion of the brake assembly comprises the brake pedal. A push rod extends from the occupant side of the booster through the lower dash panel and is actuated by an upper portion of the brake pedal. The pedal is pivotally mounted to and sandwiched between a pair of wing-shaped parallel brackets in opposing, parallel relation to one another. The parallel brackets are rigidly attached to the occupant side of the booster by rods, and also rigidly support an upper support bracket off of which are suspended the springs to bias the brake pedal toward the driver. The present invention takes advantage of its position proximate the lower dash panel such that when the engine compartment portion is pushed rearward toward the occupant compartment, the localized crush zone of the booster case induces upward rotation of the master cylinder causing the booster to pivot about the lower dash panel and cause the parallel brackets to rotate downward. The contact point of the assembly to the lower dash panel acts as a fulcrum point in a frontal crash which causes the brake pedal to rotate downward and away from the driver.

One of the objects of the present invention is to provide a booster designed to fail at a localized crush zone in a crash without adding additional parts to the assembly. This is accomplished by providing a material deformation such as a stamped bead across the area where bending is desired. This creates a controlled bend at a specific location.

Another object of the present invention is to facilitate the planned failure of the booster and to bias the rotation of the master cylinder upward when a crash occurs. This is facilitated by providing an angle reservoir for the initial position. That is, the longitudinal axis of the master cylinder is disposed at an angle relative to the horizontal initially. Thus, if a crash occurs, the booster is designed to crush along an area above the center of the booster, and the angled initial position biases the rotation of the master cylinder upward.

Yet another object of the present invention is to move the brake pedal away from the driver in the event of a crash. This is accomplished by the resulting downward rotation of the parallel brackets when the master cylinder rotates upward. This motion causes the brake pedal to move downward and away from the driver, that is, toward the lower dash panel.

Depending on the severity of the impact, it may be impossible to prevent intrusion of the brake assembly into the occupant compartment of the vehicle. Biasing the movement of the master cylinder in the manner of the present invention and thereby biasing the downward movement of the brake pedal lessens the likelihood of intrusion, and if intrusion does occur, reduces the chance of injury to the driver.

The configuration of the present invention reduces the number of parts and complexity as compared to the prior art assemblies, and achieves the combined objectives of reducing intrusion of the engine compartment portion of the brake assembly into the occupant compartment, and of moving the brake pedal away from the driver in a crash.

Other configurations, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views. In the drawings.

DETAILED DESCRIPTION

Figure 3:
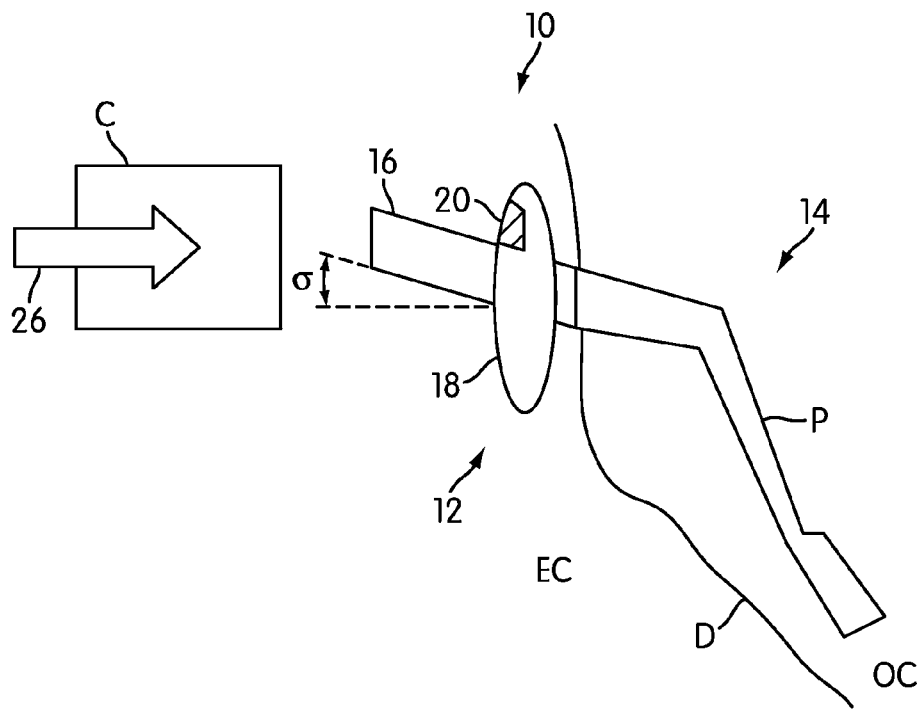
FIG. 3 is a schematic diagram of a brake assembly of the present invention prior to a crash.
Figure 4:
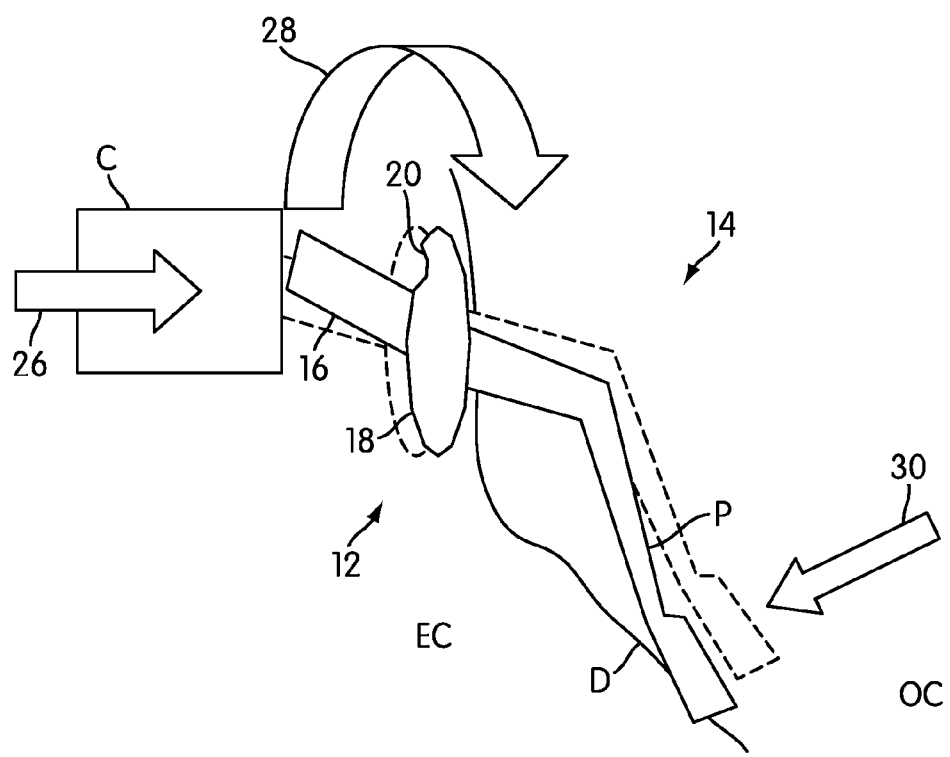
FIG. 4 is a schematic diagram of the brake assembly of FIG. 3 after a crash.

Referring to FIGS. 3-4, the brake assembly of the present invention is shown pre-crash in FIG. 3 and post-crash in FIG. 4. As shown schematically in FIGS. 3-4, brake assembly 10 is mounted to the vehicle with some components in engine compartment EC and other components in occupant compartment OC. Lower dash panel D separates engine compartment EC from occupant compartment OC. Brake assembly 10 has an EC portion 12, and an OC portion 14. Because an engine compartment EC is so tightly organized with components, there is generally some component C that is proximate the brake assembly. In the vehicle shown schematically in FIGS. 3-4, component C happens to be a battery, but component C could be any other component depending on the exact configuration of the engine. At rest, FIG. 3, component C is spaced away from brake assembly 10 in which master cylinder 16 extends furthest into engine compartment EC. Master cylinder 16 has a longitudinal axis and is mounted such that the longitudinal axis is at an angle $\alpha$ with respect to the horizontal. Master cylinder 16 extends into disc-shaped booster 18 at a center point of booster 18. Booster 18 is formed with a localized crush zone 20. Crush zone 20 is shown as being in the upper half of booster 18 on the engine compartment side. Push rod 22 extends out of a center point of booster 18 on the occupant compartment side, and extends through lower dash panel D into occupant compartment OC where it can be actuated by brake pedal 24. Push rod 22 has a longitudinal axis that is axially aligned with the longitudinal axis of master cylinder 16. Arrow 26 in FIGS. 3-4 indicates the rearward direction of the forces in a frontal or frontal offset collision. As seen in FIG. 4, in the event of a collision, component C is forced rearward and makes contact with master cylinder 16. In FIG. 4, the dashed line shows the components pre-crash. The angled initial setting of master cylinder 16 induces an upward rotation of the assembly as shown by arrow 28, and this rotation is biased further by the failure of booster 18 at crush zone 20.

Figure 1:
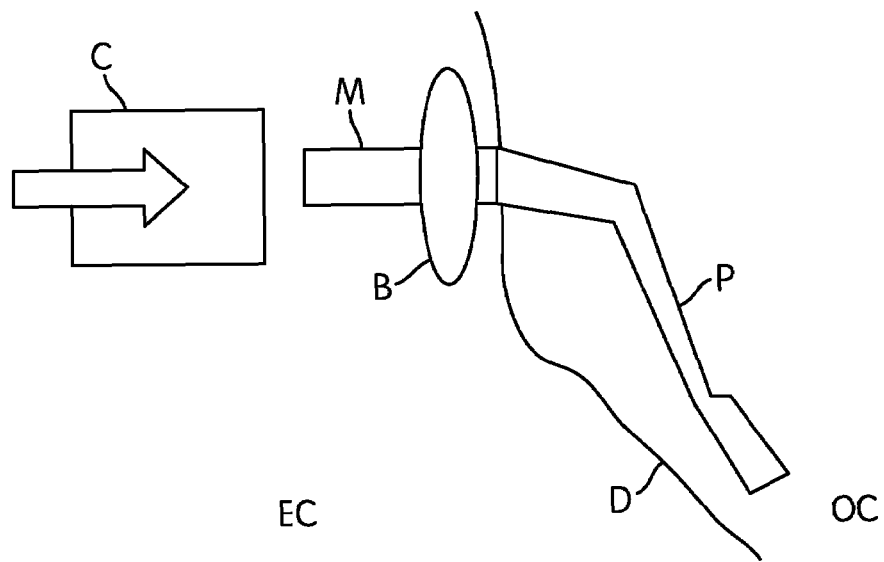
FIG. 1 is a schematic diagram of a prior art brake assembly prior to a crash.
Figure 2:
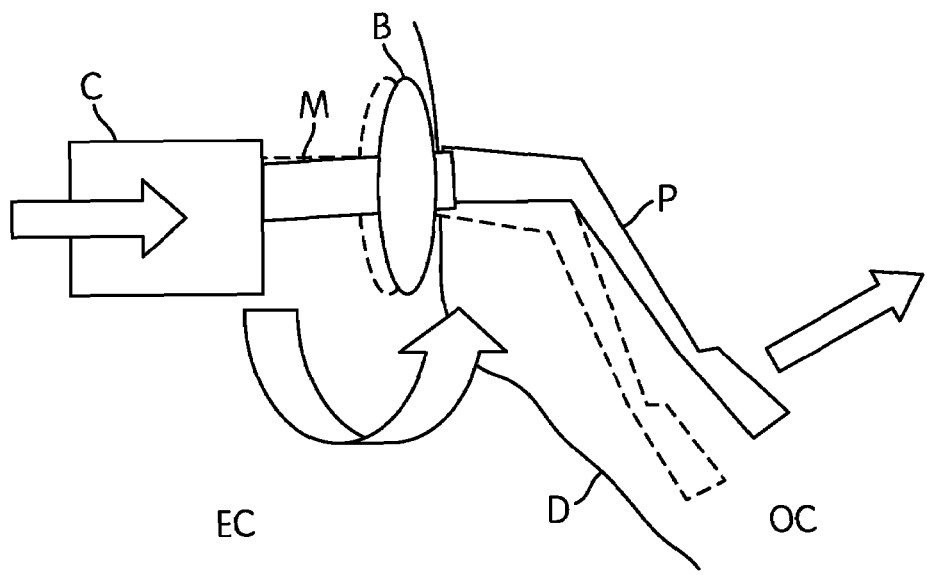
FIG. 2 is a schematic diagram of a prior art brake assembly after a crash.

The collision can also force the assembly to bear against lower dash panel D. This contact point serves as a fulcrum at which rotation 28 of the master cylinder and booster causes brake pedal 24 to move downward and away from the driver as indicated by arrow 30. This contrasts with the prior art configurations, FIG. 2, in which the brake pedal was pushed toward the driver. Since the driver's foot is likely to be pressing hard on the brake pedal in a frontal collision, significant movement of the brake pedal toward the driver can result in injury to the foot or leg.

Figure 5:
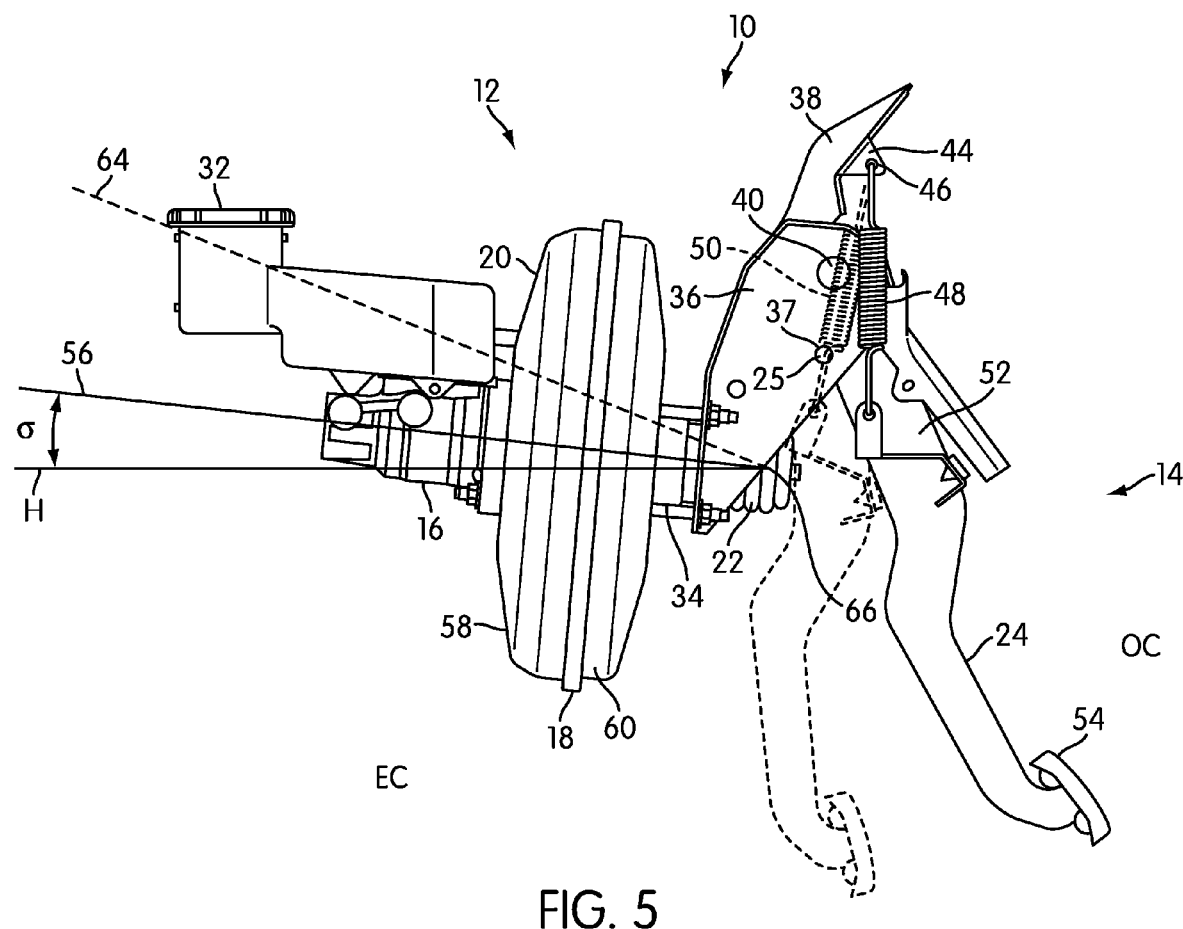
FIG. 5 is an elevational view of a brake assembly of the present invention.
Figure 6:
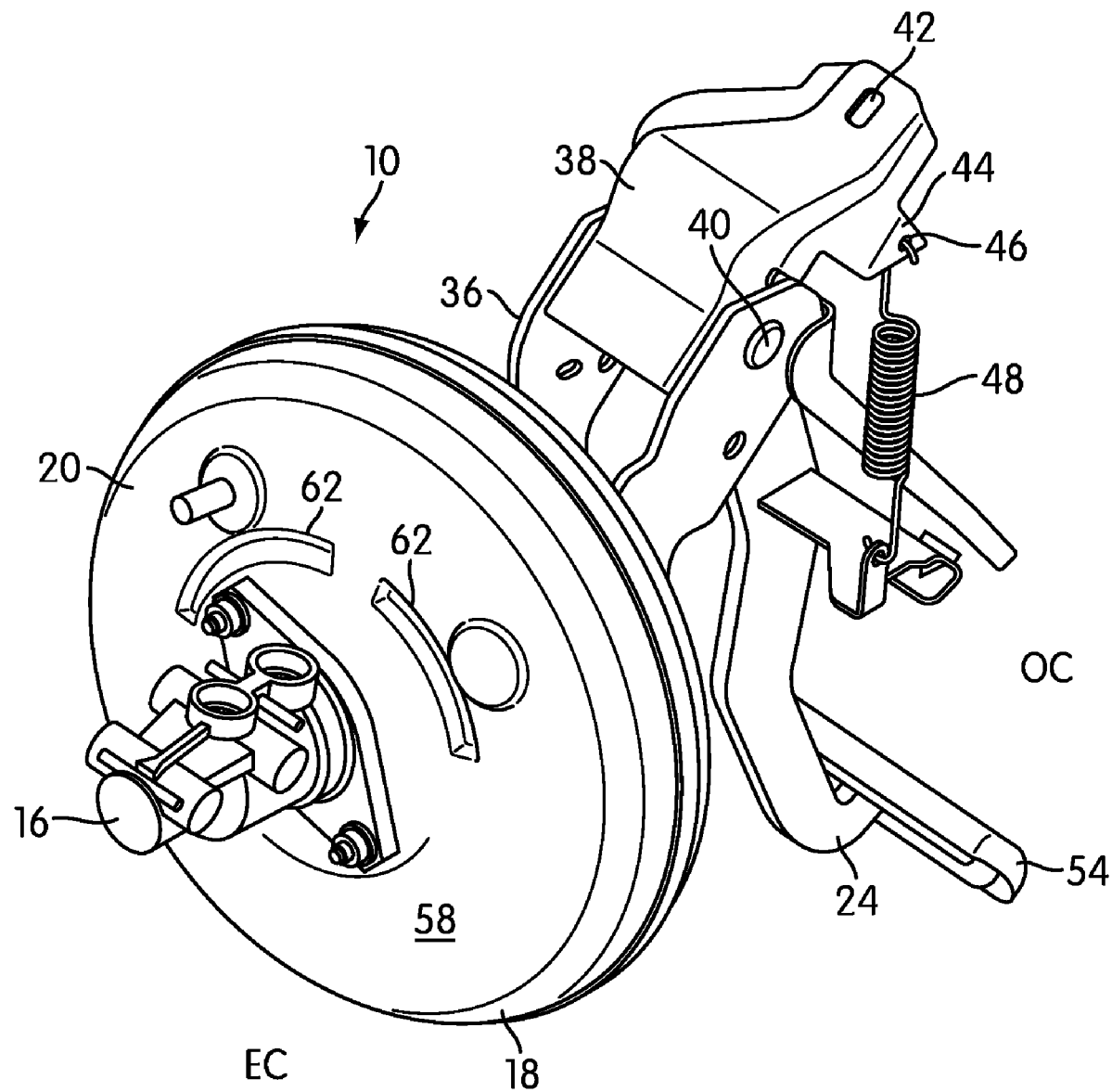
FIG. 6 is a perspective view of the brake assembly.

FIGS. 5-6 illustrate the actual components of brake assembly 10 in elevational and perspective views. The EC portion of brake assembly 10 comprises master cylinder 16, booster 18 and fluid reservoir 32. Push rod 22 extends out of booster 18 toward occupant compartment OC. Surrounding push rod 22 on the OC side of booster 18 are four connecting rods 34. Connecting rods 34 rigidly support a pair of wing-shaped parallel brackets 36 that extend upward and rearward from booster 18. The wing-shaped brackets are in opposing parallel relation to one another. Each of the parallel wing brackets includes a brake pedal connection aperture 37 which pivotally support brake pedal 24 by way of pin 25. The parallel wing brackets rigidly connect to an upper support bracket 38 that extends further upward from parallel brackets 36. Upper bracket 38 is contoured and has parallel depending walls which contain joint 40 by which upper bracket 38 is connected to parallel brackets 36. The free end of upper bracket 38 has an aperture 42 which is used to connect the brake assembly to an instrument panel member, not shown. Near the free end, upper bracket 38 also has angled lugs 44 having apertures 46 from which one end of spring 48 is suspended. Spring 48 extends downward and has its opposite end coupled to an upper portion of brake pedal 24. Another spring 50 also has an end coupled to brake pedal 24, and an upper end suspended from another component, not shown. Springs 48 and 50 bias the brake pedal toward its rest position to maintain it away from push rod 22 so as to ensure that the brake is not actuated unintentionally. The rear edges of parallel brackets 36 are disposed alongside the lower dash panel, such that if the assembly were forced rearward, parallel brackets 36 would bear against the lower dash panel. Brake pedal 24 has an upper actuating portion 52 that contacts push rod 22, and a lower foot portion 54 on which the driver presses with the foot. OC portion 14 comprises brake pedal 24. The upper portion of the brake pedal is also located in the occupant compartment OC but may not be visible to the occupants as it may be hidden by an instrument panel.

The structural features of brake assembly 10 that enable it to achieve the desired rotation of the brake assembly in a frontal collision, the EC portion upward and the OC portion downward, include the crush zone on the booster and the angled initial position of the assembly.

Booster 18 has an EC section 58 and an OC section 60. These resemble conventional booster casing sections with the exception of a localized crush zone 20 on EC section 58. Crush zone 20 can be formed by any sort of material deformation on EC section 58 of booster 18. A material deformation or weakened area is provided to control the location of failure of the booster in the even of a frontal collision. In the embodiment illustrated, crush zone 20 comprises a pair of stamped beads 62 integrally formed on EC section 58. Stamped beads 62 are best seen in FIG. 6, and are arc-shaped. Including the small interruption between them, the two beads cover a total angular span of 180° along the upper half of the circular face of the booster. Any configuration of beads and interruptions could be implemented as long as the total angular span covers approximately 180° as shown. A continuous 180° bead would also provide the desired results. With regard to bead design, it is generally advantageous to provide a symmetrical pattern from side to side, however it is possible that in some instances, an asymmetrical pattern may be called for in order to bias the controlled failure to one direction over another.

The stamped beads are designed to be the controlled locus of bending when booster section 58 fails due to a collision. Localizing the crush zone is a way of directing the force of a collision to achieve a desired result. In this, the desired result is for the EC section 58 to bend along the beads to facilitate upward rotation of the master cylinder.

Another structural feature that facilitates the desired rotation of the components is the initial position of brake assembly 10 with an angle reservoir best seen in FIGS. 3 and 5. Main axis 56 of the assembly extends through the aligned longitudinal axis of the master cylinder and the push rod and through the center of the booster. Main axis 56 is angled relative to the horizontal axis H by an angle $\sigma$. Angle $\sigma$ preferably ranges from 5° to 30° and there are limits based on the functionality of the brake system. Generally, a higher the value for angle $\sigma$ impacts brake function more. It has been determined that the 5° to 30° range is optimal.

When a frontal collision occurs, some other component C in the engine compartment will be pushed rearward into master cylinder 16. Since main axis 56 is initially positioned at an angle relative to the horizontal, the rearward force rotates master cylinder upward to dashed line 64 which represents a post-crash position of main axis 56. As seen in FIG. 5, lines 56 and 64 extend from a single point 66 included on the parallel brackets, which is the fulcrum point for the assembly upon rotation. Fulcrum point 66 is generally located proximate lower dash panel D when brake assembly 10 is pushed against it due to a crash. Since parallel brackets 36 are rigidly attached to booster 18, when booster 18 is rotated upward as shown by line 64, parallel brackets 36 also rotate causing brake pedal 24 to move downward about the fulcrum point as shown by arrow 30 in FIG. 4. The downward movement of brake pedal 24 about pin 25 is shown in dashed lines in FIG. 5. The upward rotation of the EC portion causing downward rotation of the OC portion, in particular, the brake pedal is achieved with no additional parts by engineered failure of the booster case at the localized crush zone.

Without multiple master cylinder parts or booster parts, complex linkages or breakaway connectors as in the prior art, the present invention takes advantage of the angled initial position of the brake assembly and the integrally formed bending beads on booster 18 to provide a crash-safe brake assembly. The crush zone of the booster case adds nothing to the assembly and thereby avoids the need to use specially designed cutting flanges or reinforcement plates in the booster as in the prior art. Reducing the number of parts simplifies manufacture and thereby reduces cost.

Figure 7:
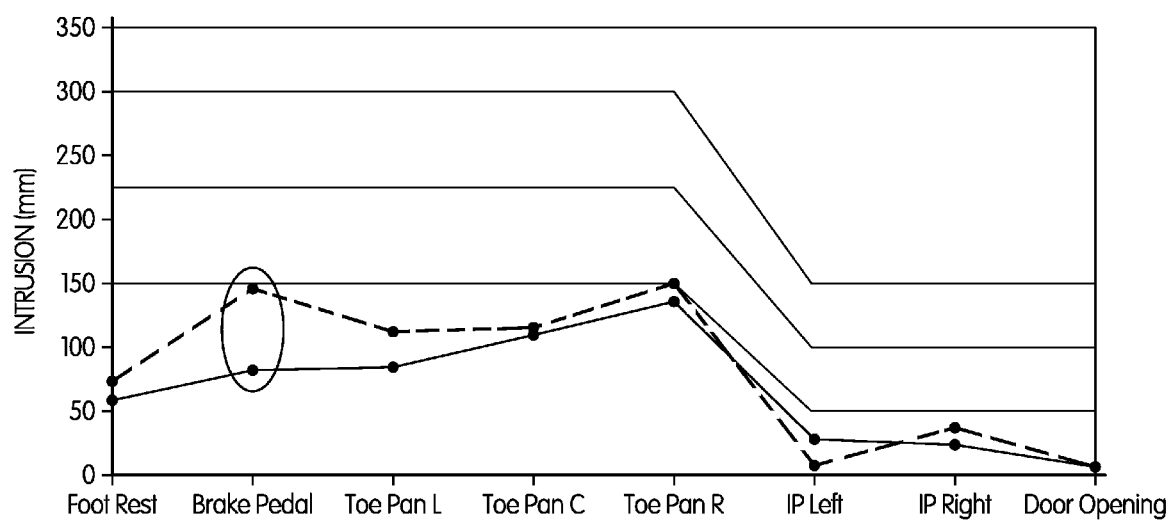
FIG. 7 is a graph showing a comparison of crash data of two vehicles at 64 km/hour into a 40% offset deformable barrier.

To quantify the reduction in intrusion with the brake assembly of the present invention, a series of crash tests were conducted. FIG. 7 shows a graph of crash data comparison for two vehicles at 64 km/hour into a 40% offset deformable barrier. The dashed line plot represents the intrusion data of a vehicle equipped with a prior art brake assembly. The light solid line plot represents the intrusion data of a vehicle equipped with a brake assembly in accordance with the present invention. Intrusion occurs in all test modes, but the test mode of 64 km/hour into a 40% offset deformable barrier (ODB) showed the worst case. This is the mode that is used by both the Insurance Institute for Highway Safety (IIHS) and the European New Car Assessment Programme (EuroN-CAP). As seen in FIG. 7, the prior art brake pedal intruded into the occupant compartment almost 150 mm. In contrast, the brake pedal in the inventive assembly intruded 64 mm less with represents a 44% reduction in intrusion. A 44% reduction without any additional parts on the master cylinder or booster or complex linkages as taught in the prior art. This represents a significant, quantifiable reduction in the likelihood of injuries to the driver.

While various embodiments of the invention have been described, it will be apparent to those of ordinary skill in the art that may more embodiments and implementations are possible that are within the scope of the invention.

What is claimed is:

1. A crash-safe brake assembly for a vehicle comprising an engine compartment and an occupant compartment with a dash panel therebetween, said brake assembly comprising:
    a master cylinder disposed in the engine compartment;
    a booster also disposed in the engine compartment and connected to said master cylinder at a central point of said booster, said booster comprising a material weakness integrally formed on an engine compartment side thereof to serve as a locus of bending in the event of a collision;
    a push rod extending between the engine compartment and the occupant compartment and connected to a central point of said booster on an occupant compartment side thereof, wherein longitudinal axes of said master cylinder and said push rod are axially aligned to define a main axis extending through said central point of said booster, and said main axis is angled relative to a horizontal reference;
    a pair of parallel brackets rigidly connected to said booster on the occupant compartment side thereof;
    a brake pedal directly pivotally attached to and supported by said parallel brackets and disposed proximate said push rod to enable contact therewith when actuated;
    an upper support bracket rigidly attached to said parallel brackets and secured to an instrument panel, said upper support bracket supporting a spring also attached to said brake pedal to bias said brake pedal in a rest position that does not apply pressure to said push rod; and
    a fulcrum point, said fulcrum point being a point common to said main axis and said horizontal reference;
    wherein on application of an external force pushing said master cylinder toward the occupant compartment, said material weakness on said booster fails thereby rotating said main axis and therefore said master cylinder and said booster upward to induce said brake pedal to rotate downward about said fulcrum point, said fulcrum point being a point on said main axis after cessation of application of said external force; and
    wherein on said application of said external force, said master cylinder rotates at an angle greater than an angle rotated by said booster and wherein said angle rotated by said booster is substantially the same as an angle rotated by said brake pedal.

2. The brake assembly of claim 1, wherein said material weakness formed on said booster is a stamped bead.

3. The brake assembly of claim 2, wherein said stamped bead is arcuate and extends 180°.

4. The brake assembly of claim 3, wherein said stamped bead extends along an upper half of said booster.

5. The brake assembly of claim 3, wherein said main axis is angled from the horizontal reference between 5° and 30°.

6. The brake assembly of claim 2, wherein said main axis is angled from the horizontal reference between 5° and 30°.

7. The brake assembly of claim 1, wherein said main axis is angled from the horizontal reference between 5° and 30°.

8. A crash-safe brake assembly for a vehicle having an engine compartment and an occupant compartment with a dash panel therebetween, said assembly comprising:
    an engine compartment portion comprising a master cylinder and a booster defining a longitudinal axis and initially positioned such that said longitudinal axis is angled with respect to a horizontal reference,
    a push rod extending from said engine compartment portion into the occupant compartment; and
    an occupant compartment portion adapted to actuate said push rod and comprising a pair of parallel brackets, an upper support member attaching one end of the parallel brackets to an instrument panel, and a pedal directly and pivotally connected to said parallel brackets such that in the event of a frontal collision upward rotation of said engine compartment portion induces downward rotation of said occupant compartment portion, wherein said assembly defines a fulcrum point common to the longitudinal axis, said horizontal reference and a position of said longitudinal axis after said frontal collision
    wherein in the event of said frontal collision, said master cylinder rotates at an angle greater than an angle rotated by said booster and wherein said angle rotated by said booster is substantially the same as an angle rotated by said brake pedal.

9. The brake assembly of claim 8, wherein said booster includes a localized crush zone which along with the angled orientation biases rotation of said engine compartment portion upward about said fulcrum point in the event of a frontal collision.

10. The brake assembly of claim 9, wherein said localized crush zone is a stamped bead on said booster.

11. The brake assembly of claim 10, wherein said stamped bead is arcuate and extends 180°.

12. The brake assembly of claim 11, wherein said stamped bead extends along an upper half of said booster.

13. The brake assembly of claim 9, wherein said localized crush zone comprises a plurality of stamped beads on said booster.

14. The brake assembly of claim 13, wherein said plurality of stamped beads extends 180° along an upper half of said booster.

15. The brake assembly of claim 8, wherein said longitudinal axis is angled relative to the horizontal reference between 5° and 30°.

16. A crash-safe brake assembly for a vehicle having an engine compartment and an occupant compartment with a dash panel therebetween, said assembly comprising:
    an engine compartment portion comprising a master cylinder and a booster and defining a longitudinal axis and initially positioned such that said longitudinal axis is angled with respect to a horizontal reference, said engine compartment portion having a dash panel contact element adapted to bear against the dash panel in the event of a frontal collision;
    a push rod extending from said engine compartment portion into the occupant compartment;
    an occupant compartment portion adapted to actuate said push rod and connected to said engine compartment portion such that in the event of a frontal collision upward rotation of said engine compartment portion induces downward rotation of said occupant compartment portion, the occupant compartment portion comprising a pair of parallel brackets, an upper support member attaching one end of the parallel brackets to an instrument panel, and a brake pedal directly and pivotally attached to each of the parallel brackets;

a fulcrum point that is a point common to the horizontal reference, the longitudinal axis, and the position the longitudinal axis takes after the frontal collision; and wherein in the event of said frontal collision, said master cylinder rotates at an angle greater than an angle rotated by said booster and wherein said angle rotated by said booster is substantially the same as an angle rotated by said brake pedal.

17. The brake assembly of claim 16, wherein the booster includes a localized crush zone which along with the angled orientation biases rotation of said engine compartment portion upward about the fulcrum point in the event of a frontal collision.

18. The brake assembly of claim 17, wherein the localized crush zone is a stamped bead on the booster.

19. The brake assembly of claim 18, wherein the stamped bead is arcuate and extends 180°.

20. The brake assembly of claim 19, wherein the stamped bead extends along an upper half of the booster.

21. The brake assembly of claim 17, wherein the localized crush zone comprises a plurality of stamped beads on the booster.

22. The brake assembly of claim 21, wherein the plurality of stamped beads extends 180° along an upper half of the booster.

23. The brake assembly of claim 16, wherein the longitudinal axis is angled relative to the horizontal reference between 5° and 30°.

* * * * *